US011509690B2

(12) United States Patent
St. Pierre (10) Patent No.: US 11,509,690 B2
(45) Date of Patent: Nov. 22, 2022

(54) MANAGEMENT OF BOTNET ATTACKS TO A COMPUTER NETWORK

(71) Applicant: Brian St. Pierre, Acworth, NH (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 345 days.

(21) Appl. No.: 16/690,567

(22) Filed: Nov. 21, 2019

(65) Prior Publication Data

US 2021/0160283 A1    May 27, 2021

(51) Int. Cl.
*H04L 29/06* (2006.01)
*H04L 9/40* (2022.01)
*H04L 61/4511* (2022.01)

(52) U.S. Cl.
CPC ...... *H04L 63/1491* (2013.01); *H04L 61/4511* (2022.05); *H04L 63/1458* (2013.01)

(58) Field of Classification Search
None
See application file for complete search history.

(56) References Cited

U.S. PATENT DOCUMENTS

| | | | | |
|---|---|---|---|---|
| 2005/0210534 A1* | 9/2005 | Krishnamurthy | ... | H04L 63/1491 726/23 |
| 2008/0320095 A1* | 12/2008 | Pearson | ............ | H04L 63/1408 709/207 |
| 2013/0091570 A1* | 4/2013 | McCorkendale | ..... | H04L 63/145 726/23 |
| 2015/0215334 A1* | 7/2015 | Bingham | ............ | H04L 63/1425 726/23 |
| 2015/0295945 A1* | 10/2015 | Canzanese, Jr. | ........ | G06F 21/55 726/23 |
| 2016/0044054 A1* | 2/2016 | Stiansen | ............. | H04L 63/1416 726/24 |
| 2018/0063187 A1* | 3/2018 | St. Pierre | ............ | H04L 63/1433 |

* cited by examiner

*Primary Examiner* — William J. Goodchild
(74) *Attorney, Agent, or Firm* — Locke Lord LLP; Scott D. Wofsy; Christopher J. Capelli (57) ABSTRACT

A system and computer-implemented method of monitoring a network is provided. The method includes receiving a packet of network traffic, wherein the packet has an associated source and destination address pair, where this pair constitutes a connection pair. The method further includes comparing the packet to a plurality of patterns and/or compare a source or destination address of the packet to known malicious addresses, and upon determining that the packet matches a pattern of the plurality of patterns or the source or destination address of the packet matches a known malicious address. The method further includes deploying a honeypot in a container for the pattern matching the packet, if not yet deployed, and forwarding all network traffic for the connection pair to the honeypot.

21 Claims, 6 Drawing Sheets

MANAGEMENT OF BOTNET ATTACKS TO A COMPUTER NETWORK

FIELD OF THE INVENTION

The present technology relates to management of botnet attacks, and more particularly to management of novel botnet attacks using a honeypot.

BACKGROUND

Overview

Computer network systems are constantly being probed by automated systems that seek vulnerable computers to takeover for inclusion in a botnet of malicious actors forming a distributed computing cluster. The botnet can attack other computers of the probed computer network system to perform malicious acts, such as to extract private information, disrupt operation, or install malicious code on computers of the network.

Monitoring systems can use historical information to detect and/or defend from attacks or intrusions by botnets. However, sophisticated botnets can devise novel attacks that monitoring systems are not familiar with and are therefore unable to mitigate such attacks.

One method employed to learn about new types of attacks is to use honeypots installed with software that is known to be vulnerable to attack. When an attack on the honeypot occurs, the session can be logged so that administrators can analyze the attack and possibly derive new patterns to use for detecting and mitigating future attacks. Such deployment of honeypots requires manual analysis that does not scale well and can be ineffective during a large attack. Additionally, there is a time lag from the time of attack until sufficient data can be logged and analyzed. Further delays are incurred for updating monitoring systems with the newly derived patterns to be used for mitigation. During these time lags, until mitigation is setup, the computer networks are vulnerable to these novel attacks.

Such conventional methods and systems have generally been considered satisfactory for their intended purpose. However, there is still a need in the art for a method to quickly detect and mitigate novel botnet attacks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of monitoring a network is provided. The method includes receiving a packet of network traffic, wherein the packet has an associated source and destination address pair, where this pair constitutes a connection pair. The method further includes comparing the packet to a plurality of patterns and/or compare a source or destination address of the packet to known malicious addresses, and upon determining that the packet matches a pattern of the plurality of patterns or the source or destination address of the packet matches a known malicious address of the known malicious addresses. The method further includes deploying a honeypot in a container for the pattern matching the packet, if not yet deployed and forwarding all network traffic for the connection pair to the honeypot.

In accordance with another aspect of the disclosure, a monitoring system is provided to monitor a network. The system includes a memory configured to store instructions and a processor disposed in communication with the memory. The processor upon execution of the instructions is configured to perform the operations of the method.

In accordance with still another aspect of the disclosure, a further method is provided to monitor a system. The method includes, from deployment in a honeypot isolation environment, detecting each inbound and outbound DNS request to or from the deployment and forwarding each detected DNS request for resolution of a DNS name in the DNS request to a destination address by a DNS server.

In accordance with still another aspect of the disclosure, a honeypot is provided to monitor a network. The honeypot includes a memory configured to store instructions and a processor disposed in communication with the memory. The processor upon execution of the instructions is configured to perform the operations of the further method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
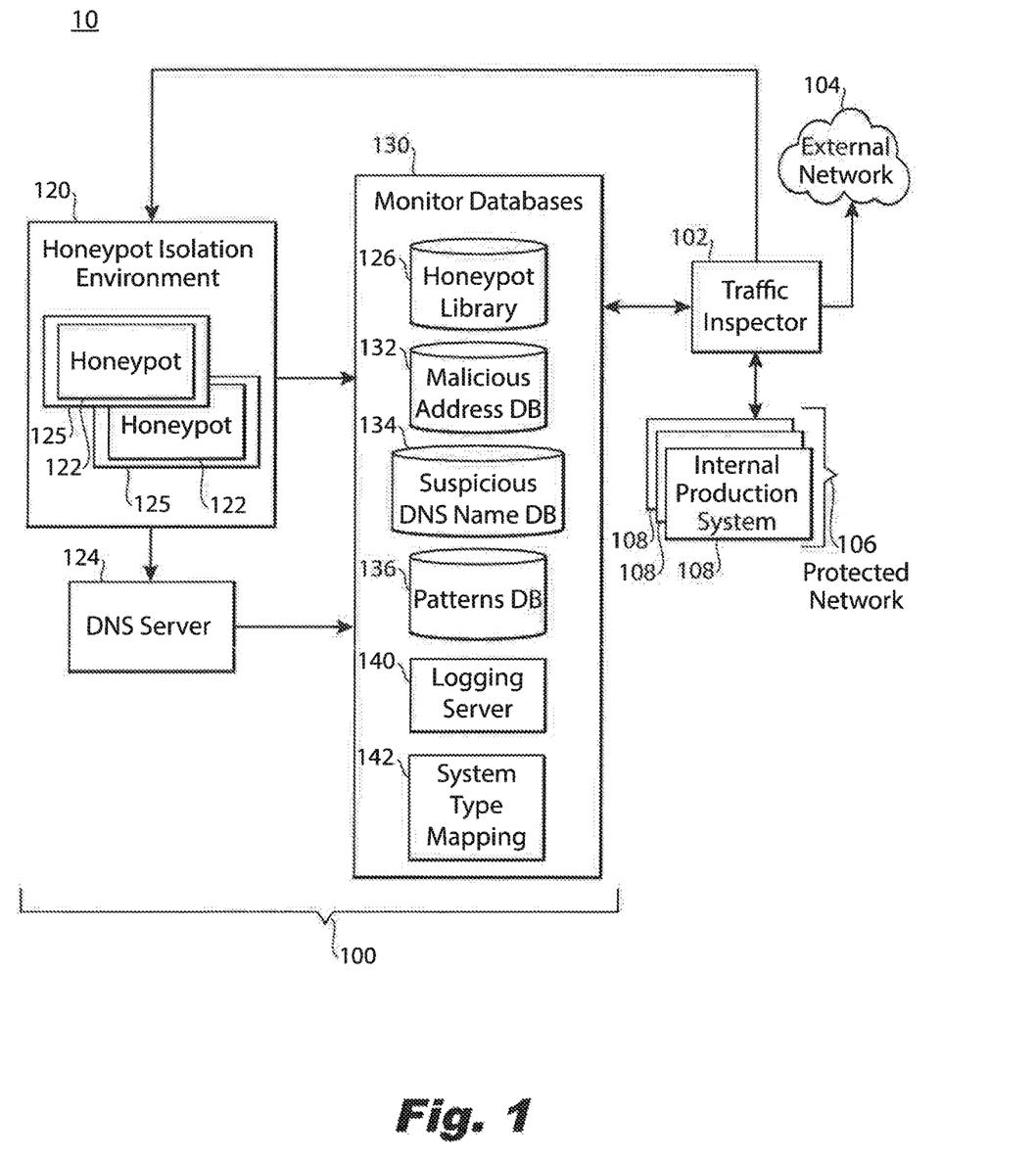
FIG. 1 illustrates a block diagram of an example monitor system in a network environment, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-6, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for exam*, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 10 includes a monitoring system 100 and a protected network 106 having internal production systems 108 that can communicate with an external network 104. Monitoring system 100 monitors communication to and from the protected network 106, including inbound traffic to the internal production systems 108 from external network 104, as well as outbound traffic from the internal production systems 108 to other internal production systems 108 or the external network 104. Components of the monitor system include a traffic inspector 102, a honeypot isolation environment 120, a monitor database 130, a DNS server 124, a logging server 140, and a honeypot library 126. These components can communicate with one another in accordance with the methods described below, wherein the communication be performed using wired and/or wireless communication links.

In the example shown, the internal production systems 108 are included in a protected network 106 that can be provided at a single geographic location or can be distributed among multiple geographic locations that can be remote from one another. Examples of protected networks 106 include corporations that have multiple corporate offices, a university that can have multiple buildings and/or campuses, or a home network. The protected network 106 can include, for example, a local area network (LAN), a wide area network (WAN), and/or a VPN. Examples of protected hosts include servers, desktop computers, laptop computers, smart sensors, mobile device (cell phones, tablets, etc.). Examples of internal production systems 108 include servers (e.g., web servers, bank servers, web browsers, application servers, communication servers, name servers, file servers, etc.), desktop computers, laptop computers, mobile devices, etc.

The external network 104 itself is unprotected by the monitoring system 100. Rather, the internal production systems 108 are protected from communications received from the external network 104. The external network 104 can include one or more networks, such as the Internet, an external VPN, etc. The external network 104 can include external hosts, such as servers, desktop computers, laptop computers, smart sensors, mobile device (cell phones, tablets, etc.).

The monitor system 100 can be provided within or at the edge of the protected network 106, in a public network, and/or can be deployed as a cloud-based server accessible via a network, such as the Internet, a public network, or a private network.

DNS server 124 is a computing system that executes programmable instructions to respond to DNS queries exclusively from the honeypots 122, wherein the honeypots 122 serve as decoys for an attack. When DNS server 124 receives a DNS query, it resolves a DNS name included in the DNS query by determining an IP address that corresponds to the DNS name. The DNS server 124 can be include a physical machine that is physically near the honeypots 122 and/or traffic inspector 102, or can be a virtual machine in which the programmable instructions are executed by a remote physical computing device.

Since the honeypots 122 are each decoys for an attack, none of the honeypots 124 would make a DNS request of its own volition. Accordingly, each DNS request received by DNS server 124 is directed by an attacker. However, this does not mean that every DNS name in every DNS request is malicious, as an attacker may be trying to resolve a legitimate DNS name, such as in a non-limiting example in which the attacker directs the honeypot to send a legitimate search request to a legitimate search engine.

Accordingly, DNS server 124 treats every DNS request received as being for a potentially harmful domain by logging all of the DNS names included in received DNS requests in the suspicious DNS name DB 134. This allows monitor system 100 to track all DNS names that are used by an attacker via a honeypot 122. Although each DNS name is not necessarily malicious, a domain might be used by an attacker for the purposes of botnet command and control, or as host malware, or for hosting secondary attacker tools that are downloaded onto a compromised system to allow the attacker to move laterally within the network system 10. Accordingly, all DNS names in honeypot-generated DNS requests are valuable for review by a human or automatic administrator to learn which domains are used during an attack.

A red flag can be raised by a human administrator or the automatic administrator when it is determined that a domain used by an attacker is also being used by an internal production system 108. This can be an indication that an attacker may be active within that internal production system 108 or its protected network 106. Once that red flag is raised, actions can be taken for further monitoring, mitigations, and/or security action.

The DNS server 124 can look up DNS names in the suspicious name database 134 before proceeding to perform name resolution. If the DNS name is confirmed as malicious, the DNS server 124 can respond to the DNS request with an address of the traffic inspector 102, so that the attacker will proceed by sending traffic to the traffic inspector 102. By doing this, the attacker is prevented from reaching the domain with malicious traffic. Rather, the attacker's traffic will be inspected by the traffic inspector 102 and logged.

If the DNS server 124 determines that the DNS name is either not in the suspicious name DB 134, or if it is not confirmed to be malicious, then the DNS server 124 can perform normal DNS resolution by determining an IP address that corresponds to the DNS name.

In one or more embodiments, the DNS server 124 can be omitted. In this case a DNS server (not shown) external to monitor system 100 would resolve all DNS requests, including DNS requests output by honeypots 122. This would eliminate determination of suspicious or confirmed malicious DNS names. However, traffic having known patterns would still be directed through honeypots 124, malicious source addresses for traffic guided to a honeypot would be stored and compared to destinations of outbound production traffic from internal production systems 108, which could trigger security action.

The traffic inspector 102 includes a computer system that can inspect traffic to determine source and destination addresses and communicates with external network 104, internal production systems 134, and monitor databases 130. Furthermore, the traffic inspector 102 is capable of deploying honeypots 122 within honeypot isolation environment 120 using type information from a honeypot library 126 that is in communication with, but remote from, the honeypot isolation environment 120.

The traffic inspector can include the automatic administrator that is configured to analyze information stored in the logging server 140 and/or the suspicious DNS name DB 134 for determining when a name in the suspicious DNS name DB 134 should be designated as being confirmed, i.e., confirmed to be a malicious DNS name.

The monitor database 130 includes a malicious address (MA) database (DB) 132, a suspicious DNS name DB 134, a patterns DB 136, a logging server 140, and a honeypot type DB 142. The malicious address DB 132 stores addresses that have been determined to be malicious. The suspicious DNS name DB 134 stores DNS names that are suspected or confirmed of being associated with botnets. A confirmation field is associated with the entries in the suspicious DNS DB 134 to indicate whether the entry has been confirmed to be malicious. If the confirmation field is not flagged, the entry is considered to still be suspicious, but not confirmed as malicious.

The patterns DB 136 stores patterns that the system can test as either matching or not matching to a particular network packet. The patterns may be of multiple types, including but not limited to regular expressions, Berkeley Packet Filter (BPF) rules, or simple string matches, Associated with each pattern is an optional field to indicate the honeypot type that should be deployed when the pattern is matched. Honeypot types are stored in honeypot library 126 which provides templates of different system types for deploying the honeypots 122.

The logging server 140 records information about all interactions with the honeypot isolation environment 120 and the honeypots 122. The recorded information can be used to suggest new patterns for the patterns DB 136. Databases 132-140 can share the same nonvolatile data storage system or can use different storage systems that are physically near or remote from one another.

The system type mapping 142 includes a mapping between addresses for each of the internal production system 108 and a system type (e.g., one or more versions of apache and PostgreSQL). The honeypot isolation environment 120 includes a plurality of honeypots 122. Each honeypot 122 includes software instructions that operate on a computing system to appear to be a legitimate part of one of the internal production systems 108 that is being protected by the monitor system 100. The honeypots 122 can use the same or different computing systems as one another, with isolation provided between each honeypot 122. Some or all of the honeypots 122 can be virtual machines in which programmable instructions are executed by a remote physical computing device.

Each honeypot 122 is configured to be vulnerable to an attack or to provide bait to attract an attack for the purpose of being a decoy. For example, bait provided by a honeypot 122 can include information or a resource of value to an attacker. The honeypot 122 or honeypot isolation environment 120 logs information about interactions with the honeypot to a remote logging server 140, wherein the logging server 140 can be remote from the honeypots 122 and/or the honeypot isolation environment 120. In order that an attack on the honeypot 122 will not harm the internal production system 108, the honeypot 122 is isolated by a software container and optionally a hardware container from the internal production system's 108 legitimate software.

The honeypot isolation environment 120 can provide one or more containers 123 that isolate each honeypot 122 deployed within the container 123 from the internal production systems 108 and other honeypots 122. Upon deployment, each honeypot 122 is placed within one of these containers 123. In embodiments, each honeypot 122 can be provided with its own container 123 that is deployed together with the honeypot 122.

In accordance with the disclosure, honeypots 122 are deployed by traffic inspector 102 in one or more honeypot isolation environments 120. The honeypot isolation environments 120 can be distributed in different geographical locations and/or use different remote physical computing devices. Deployment of each honeypot in its container 123 can occur before and/or during operation of the network, including in response to detection of an attack by the traffic inspector 102. Accordingly, in accordance with the method of the disclosure, new honeypots 122 can be deployed as novel attacks are detected.

Deployment of a honeypot 122 and its container 123 can include allocating hardware and/or software resources on a host computer of the honeypot isolation environment 120, with the resources being isolated in the container 123. The deployed honeypot 122 is configured to perform actions instructed by received packets, including to output DNS requests to the DNS server 124.

The honeypots 122 are configured so that all of their DNS requests are provided to the DNS server 124. The deployed DNS server 124 is configured to receive and resolve all outbound DNS queries from only the honeypots 122 and store information in the suspicious DNS name DB 134 and the malicious address DB 132.

DNS server 124 can include multiple servers that can be distributed physically and/or logically. Each DNS server 124 receives DNS outbound queries from only the honeypots 122. Destination DNS names from these DNS queries are stored in suspicious DNS name DB 134, such as by the DNS server 134 handling the DNS request. Alternatively, the DNS server 134 handling the request can request another entity, such as traffic inspector 102, to store the DNS name in suspicious DNS name DB 134. DNS server 124 further resolves outbound DNS queries from the honeypots 122 to determine an address that correspond to the DNS names in the respective DNS requests output by the honeypots 122. The resolved address for a DNS name of DNS request from a honeypot 122 can be stored in malicious address DB 132 if the corresponding DNS name is confirmed to be malicious, such as by an automatic or manual analysis of data stored in logging server 140.

The traffic inspector 102 consults the malicious address DB 132 and can institute interventions for destination and source addresses in the protected network 106 of outbound traffic that were resolved from DNS requests received from an associated honeypot 122 or generated by the associated honeypot 122.

The traffic inspector 102 inspects all traffic from the external network 104 as well as outbound traffic from internal production system 108 and attempts to match the traffic inspected to the patterns in the patterns DB 124. When the traffic inspector 102 detects a match between traffic from the external network 104 and a pattern in the patterns DB 124, the traffic inspector 102 stops forwarding that traffic to an intended victim, stores the external address as an attacker in the malicious address DB 132, quickly deploys a honeypot 122 within a well-isolated container, and forwards all traffic between the suspected attacker and the intended victim to the newly deployed honeypot 122. The attacker is allowed to compromise the newly established honeypot 122. The traffic inspector 102 can assure that all traffic between the connection pair is stored in the logging server 140, such as for later manual analysis. Any DNS names in queries output by the honeypot 122 are then stored in the suspicious DNS name DB 134 as being suspicious.

Honeypot library 126 provides a library of honeypot templates that includes a honeypot template associated with each system type of internal production system 108 included in the protected network 106 and mapped to an IP address of an internal production system 108 in system type mapping 142. A honeypot template for a honeypot 122 that will act as a decoy for a particular internal production system 108 can be selected by the traffic inspector 102 based on a system type mapped to in the system type mapping 142 based on an IP address of the particular internal production system 108. The selected honeypot template is used to generate the honeypot 122. E.g., if the protected network 106 contains an apache webserver and a PostgreSQL database, then the library should include respective honeypot templates with the same version of apache and PostgreSQL. Each of the potential honeypots 122, when deployed, are deployed within a container to maintain its isolation. Honeypot library 126 can share the same nonvolatile data storage system as any of databases 132, 134, and/or 136 or can use a different storage system that is physically near or remote from any of databases 132, 134, 136, and/or 140.

The traffic inspector 102 is configured to access system-type mapping 142 to determine a mapping between an address for a targeted internal production system 108 and a system type. For example, t system-type mapping 142 can map the address of an internal production system 108 that is can be mapped in the system-type mapping to a system type for a particular apache version used by the internal production system 108. If a honeypot 122 is deployed as a decoy for this internal production system 108, a honeypot template for this particular apache version will be selected from the honeypot library 126, and the selected honeypot template will be used for deploying the honeypot 122.

When traffic from external network 104 directed to the protected network 106 is analyzed by traffic inspector 102, the traffic inspector 102 may detect that a packet is received from an address that is included in the malicious address DB 132. This indicates that the address is associated with a known attacker that has attempted or succeeded in connecting to a particular internal production system 108 having a system type. The known attacker can be detected even when there is not a match between network traffic received by the traffic inspector 102 and a pattern in pattern DB 136.

Using its system-type mapping of internal production systems 108 to system types, the traffic inspector 102 can determine which system type is mapped to the internal production system 108 that corresponds to the destination address that is being targeted by the known attacker as an intended victim. The traffic inspector 102 can then deploy a honeypot 122 of the determined system type by using a honeypot template selected from the honeypot library 126 that is based on the determined system type. The traffic inspector 102 then forwards to the deployed honeypot 122 all traffic between the detected attacker and the destination address, meaning for the connection pair, even if there is not a matching pattern in the pattern DB 136.

Additionally, since all traffic to and from the traffic inspector 102 can be logged, the traffic inspector 102 can capture individual messages from the attacker, e.g., HTTP requests, and use them to propose new patterns for addition to the patterns DB 136. Suggested new patterns can be automatically added to the patterns DB 136, such as after an automatic check to determine that the pattern will not block legitimate traffic. Alternatively or additionally, a suggested new pattern can be vetted by a system administrator (e.g., a human administrator or an automated process) to avoid adding patterns to the pattern DB 136 that could block legitimate traffic. In embodiments, the system administrator can use the logged traffic to suggest patterns to add to the patterns DB 136. In embodiments, the traffic inspector 102 can automatically export and share its malicious address DB 132, suspicious DNS name DB 134, and/or patterns database 136. For example, the shared information can be provided as "feeds" that can be consumed by other instances of the traffic inspector 102. For example, the other instances of the traffic inspector 102 can be provided at different respective sites of a large enterprise or at different respective datacenters. The shared information can also be shared between affiliated companies.

Figure 2:
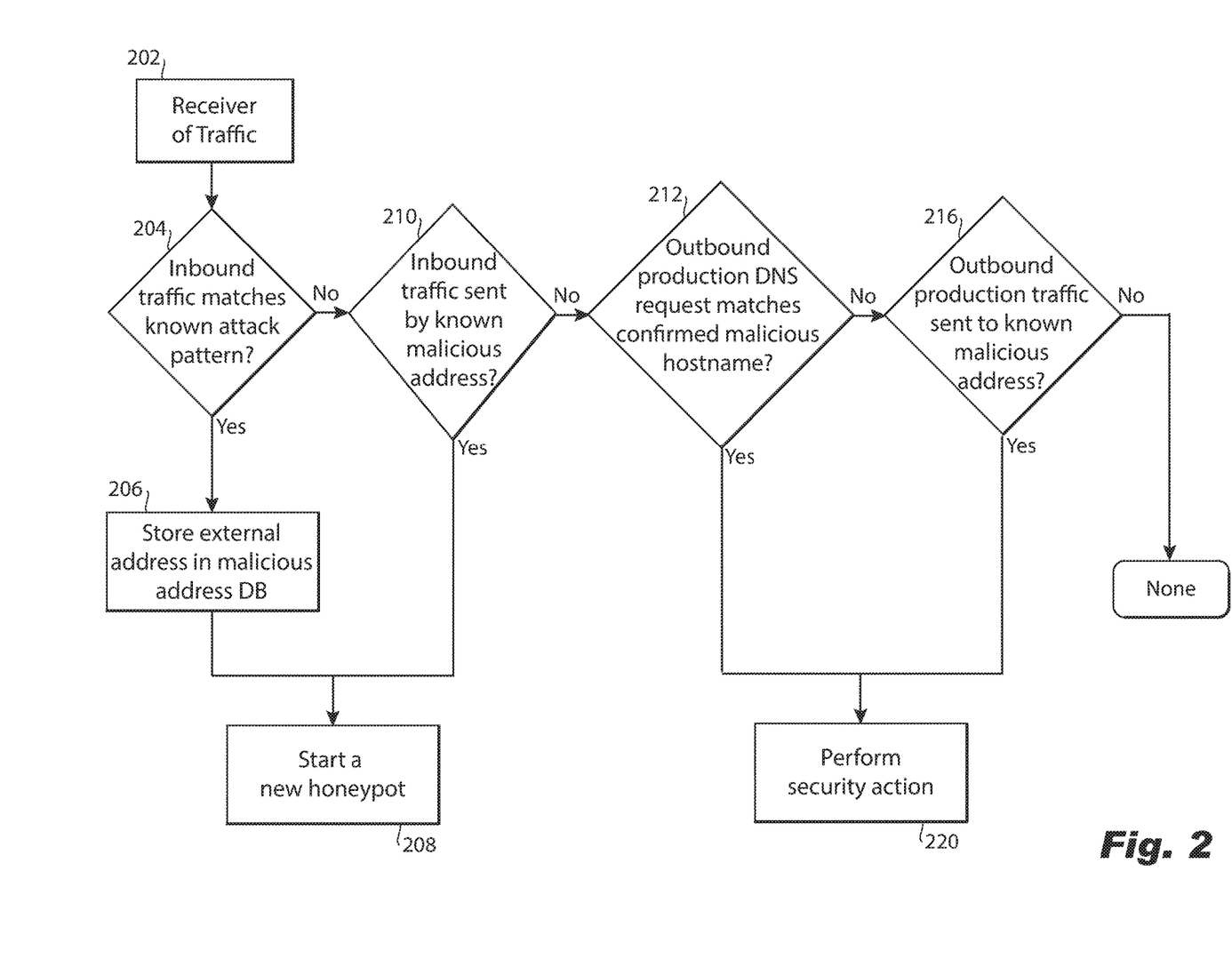
FIGS. 2-4 illustrates a flowchart showing an example method performed by a traffic inspector of the monitor system in accordance with embodiments of the disclosure.
Figure 3:
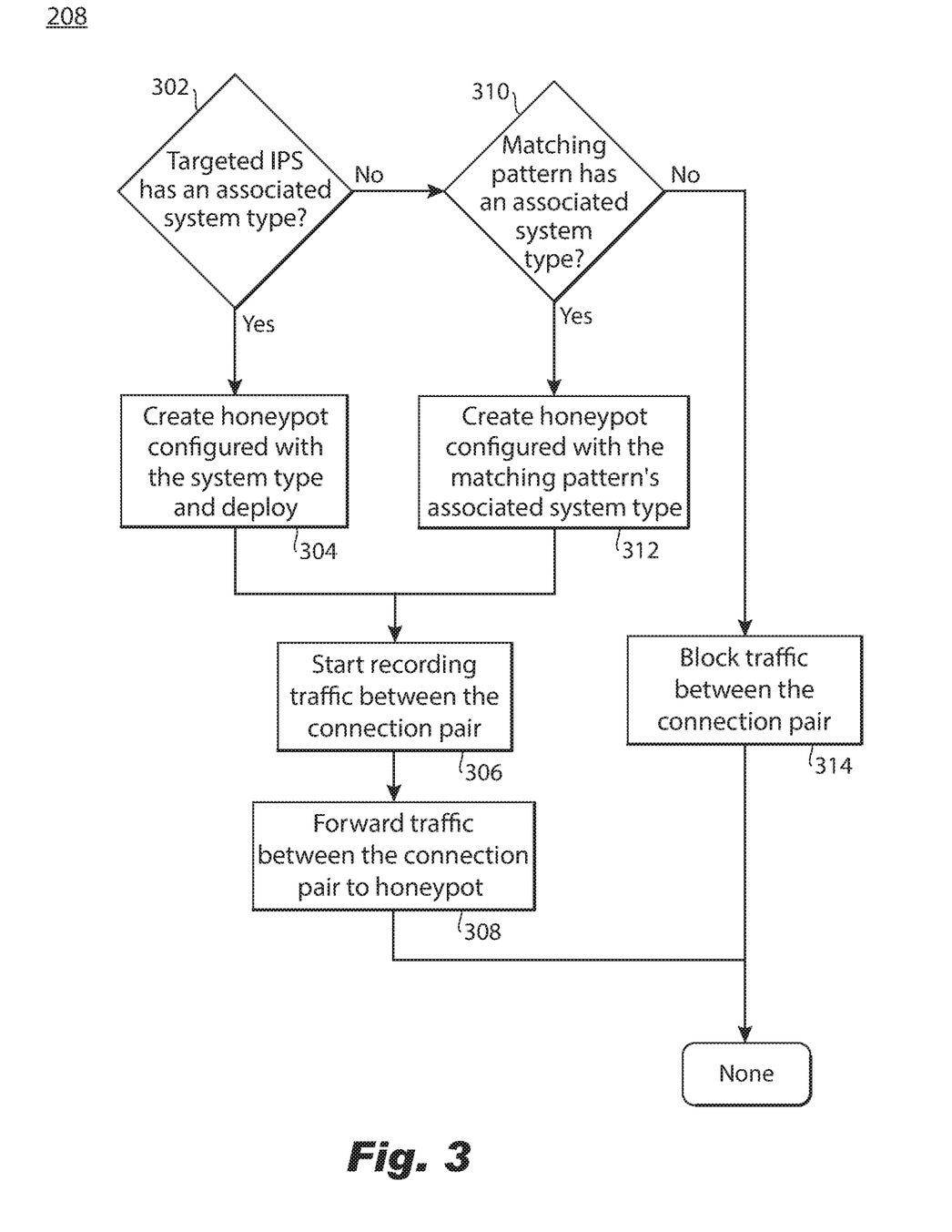
Figure 4:
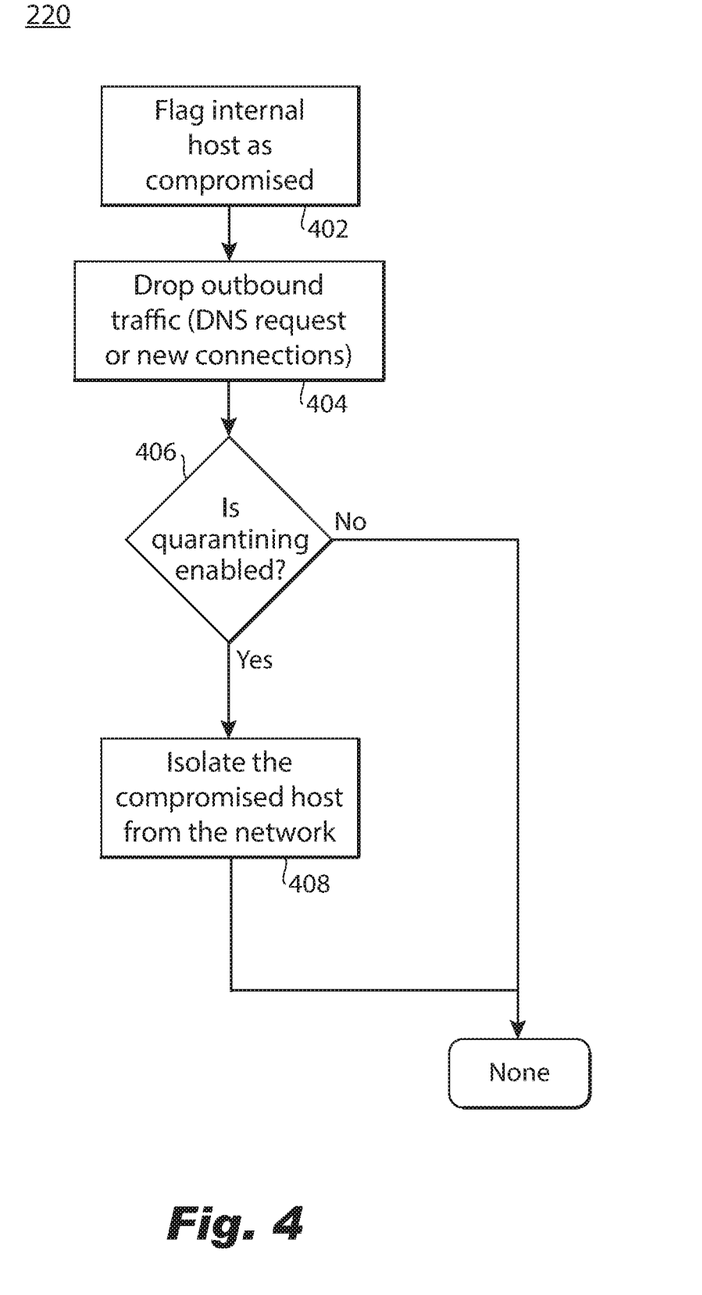

With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 2 illustrates a flowchart 200 that shows an example method performed by a traffic inspector, such as traffic inspector 102 shown in FIG. 1. At block 202, traffic is received from an external network, such as inbound traffic from external network 104 or inbound or outbound traffic from a protected network, such as protected network 106. At block 204, a determination is made whether a received packet is inbound from the external network and has a pattern that is known (e.g., matches a pattern entry already stored in a patterns database, such as patterns DB 136). If it is determined at block 204 that the packet is inbound from an external network acid its pattern known, the method continues at block 206. At block 206, the packet's source address is stored in a malicious address database as a new entry, such as malicious address DB 132. At block 208, a new honeypot, such as honeypot 122 is created, configured, and deployed in a honeypot isolation environment having a container, such as honeypot isolation environment 120. Block 208 is explained in greater detail with respect to FIG. 3.

If it is determined at block 204 that the packet is not from the external network and/or the packet's pattern is not known, the method continues at block 210. At block 210, a determination is made whether the packet is inbound from the external network and a source address of the packet is a known malicious address, e.g., (e.g., matches a malicious address entry already stored in the malicious address database). If it is determined at block 210 that the packet is inbound from an external network and the packet's source address is a known malicious address, then the method continues at block 208 for creating and deploying a new honeypot. If it is determined at block 210 that the packet's source address is not a known malicious address, then the method continues at block 212.

At block 212, a determination is made whether the packet is an outbound packet, e.g., from an internal production system (IPS), such as internal production system 108 of a protected network 106 shown in FIG. 1, that includes a DNS request for a destination DNS name that is known, meaning the DNS name requested is already stored in the suspicious DNS name DB 134 with a status of confirmed indicated in its confirmation field. If the determination at block 212 is that the packet is an outbound packet from an internal production system with a DNS request using a known DNS name that has been confirmed, the method continues at block 220, else the method continues at block 216.

At block 216, a determination is made whether the packet is an outbound packet, e.g., from an internal production system of a protected network that is protected by a monitor system, such as monitor system 100 that includes a DNS request that resolved to a known malicious address.

If the determination at block 216 is that the packet is an outbound packet with a DNS request that includes or is resolved to a known malicious address, the method continues at block 220, else the method continues at block 218. At block 220 a security action is performed for the internal production system 108 that transmitted the outbound packet processed at any of operations 212-216 for determining that a DNS name or malicious address included in the packet is known. Block 220 is described in more detail with respect to FIG. 4.

With reference to FIG. 3, block 208 for deploying and creating a new honeypot is described in greater detail. Block 208 begins at block 302 after a packet of inbound traffic was determined at operation 204 to have a known pattern or was determined at operation 210 to have a source address that is a known malicious address. At block 302, a determination is made whether the targeted internal production system identified by the packet's destination address is mapped to a system type in the system-type mapping. If it is determined at block 302 that there is a mapping of the targeted internal production system to a system type, then at block 304 a honeypot is created and configured with the system type determined by the system-type mapping and deployed in a container provided by an isolation environment, such as honeypot isolation environment 120.

The method continues at operation 306 in which a connection pair that includes the packet's source address and the destination address is established, and all traffic between these the source address and destination address of the connection pair is recorded by a logging server, such as logging server 104 shown in FIG. 1. At operation 308 all traffic between the source and destination addresses of the connection pair are forwarded to the honeypot, after which the method for processing the packet ends. Operation 308 is described in greater detail in FIG. 5.

If it is determined at block 302 that system type mapping 142 does not include a mapping to a system type for the IP address of the targeted internal production system, then at block 310 a determination is made whether the matching pattern has an associated system type pattern. If it is determined at block 310 that the matching pattern does have an associated system type, the method continues at block 312, else the method continues at block 314. At block 312 a honeypot is created and deployed with a container using a honeypot template that is based on the matching patterns associated system type. The method continues at block 306, followed by block 308, after which the method for processing the packet ends.

At block 314, which is executed when a system type cannot be determined by consulting either of the system type mapping 142 or from a system type associated with the matching pattern, a honeypot is not deployed, and all traffic between the source address and destination address of the connection pair is blocked, after which the method for processing the packet ends.

With reference to FIG. 4, block 220 is described in greater detail. Block 220 is executed when it has been determined that a packet of outbound traffic from one of the internal production systems includes a DNS request that includes a known DNS name or the DNS request was resolved to a known malicious address. At block 402, the internal production system is flagged as being compromised. At block 404 the packet is dropped. The dropped outbound traffic can include DNS requests or traffic sent to different target addresses, wherein each target address represents a different connection with the internal production system. At block 406 a determination is made whether quarantining is enabled. If it is determined at block 406 that quarantining is enabled, then at operation 408 the internal production system is quarantined by isolating it from the rest of the protected network, after which the method for processing the packet ends. Else, if it is determined at block 406 that quarantining is disabled, then the method for processing the packet ends.

Figure 5:
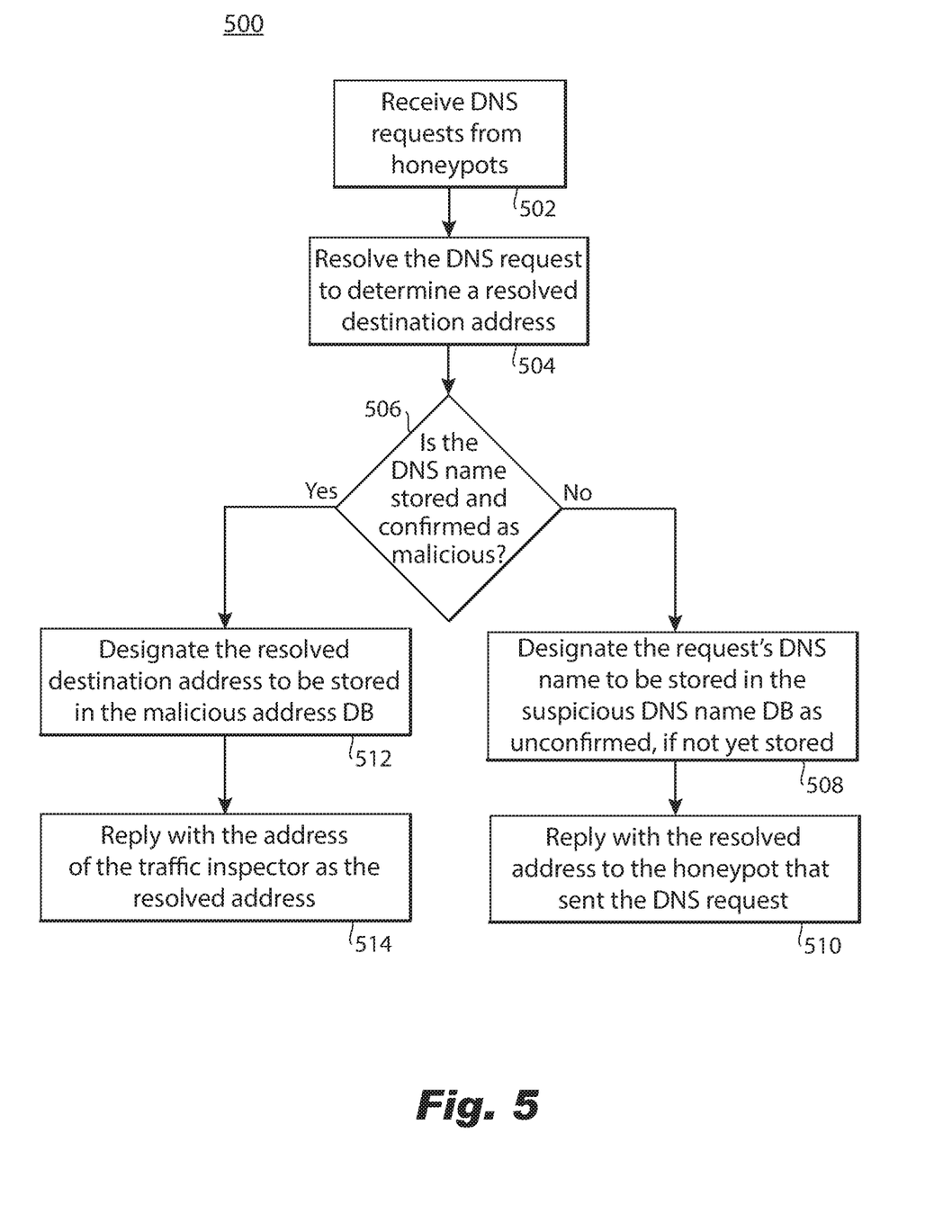
FIG. 5 illustrates a flowchart showing an example method performed by components of honeypot in a honeypot isolation environment of the monitor system in accordance with embodiments of the disclosure.

FIG. 5 illustrates a flowchart 500 of an example method performed by a DNS server, such as DNS server 124 shown in FIG. 1. At block 502 DNS requests are received from honeypots, e.g., honeypots 122 shown in FIG. 1. At block 504, the DNS request is resolved to determine a resolved destination address. At block 506, a determination is made whether the DNS name in the DNS request is already known (e.g., stored in suspicious DNS name database 134 shown in FIG. 1) and confirmed as malicious.

If the determination at block 506 is the DNS name is not known or not confirmed as malicious, then at block 508, the request's DNS name is designated to be stored in the suspicious DNS name DB as an unconfirmed entry, if not yet stored. For example, a field associated with the entry for the DNS name can have an associated confirmation field that indicates a status of "unconfirmed." At block 510, the DNS server replies with the resolved address to the honeypot that sent the DNS request.

If the determination at block 506 is the DNS name is known and confirmed as malicious, then at block 512, the resolved destination address is designated to be stored in the malicious address DB. At block 514, a reply is transmitted to the DNS request with the address of the traffic inspector provided as the resolved address. The attacker will receive the resolved address and will send its traffic to the traffic inspector. This will prevent the attacker from reaching the malicious domain, but allow the attacker's traffic to be logged and inspected.

Accordingly, in contrast with botnet management solutions that depend on prior knowledge, the method of the present disclosure uses knowledge gained during an attack to deploy honeypots and use information gathered by resolving DNS queries from the honeypots to apply a security action as protection during the same attack. This provides real time protection, even when a botnet changes tactics by using different source addresses and destination targets for attacking a target. When relying on prior knowledge, protection cannot be provided in real time by an attack that uses new tactics unseen before. Rather, sufficient time is needed to gather and analyze information and patterns. However, with the ability to detect and protect from attacks in real time, information about the attack can be shared with other monitoring systems in real time to provide widespread, real time protection from a new attack that uses new tactics that have not been seen before.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments performed by the monitor system 100 may be implemented or executed by one or more computer systems. For example, processing performed by the traffic inspector 102, honeypots 122, and DNS server 124 can be implemented using one or more computer systems, such as example computer system 602 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Figure 6:
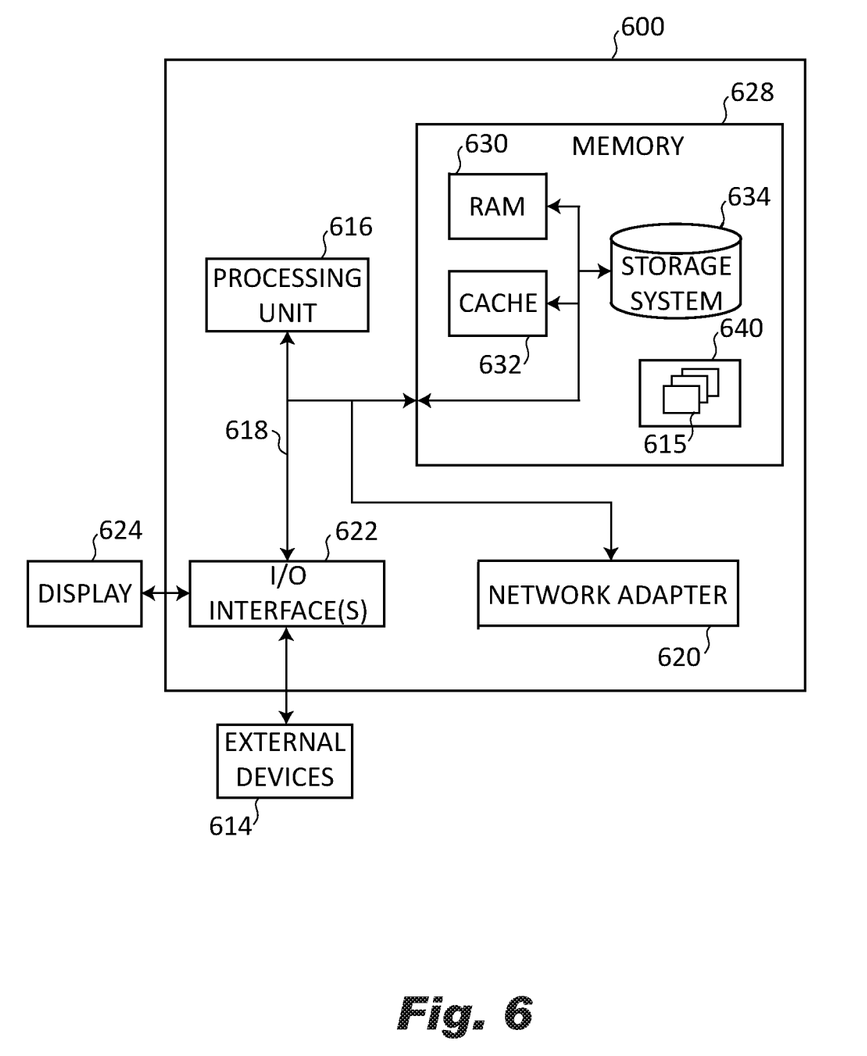
FIG. 6 illustrates a schematic block diagram of an example computer system used by the monitor system, in accordance with an illustrative embodiment of the present disclosure.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by components of the monitor system 100, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615 may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more devices that enable a user to interact with computer system 602; and/or any devices (e.g., network card, modem, etc.) that enable components of the monitor system 100 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of the monitor system 100 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer network monitoring system for managing botnet attacks to a computer network, the network monitoring system comprising:

an inspection system associated with monitoring network traffic to or from an internal network having one or more internal production systems, the inspection system having a memory configured to store instructions and a processor disposed in communication with the first memory, wherein the processor, upon execution of the instructions is configured to:

receive a packet of network traffic, the packet having an associated source and destination address pair, where this pair constitutes a connection pair;

compare a pattern of the packet to a plurality of patterns and/or compare a source or destination address of the packet to known malicious addresses;

upon determining that the packet matches a pattern of the plurality of patterns or the source or destination address of the packet matches a known malicious address of the known malicious addresses, consult a system-type mapping that maps each internal production system to a system type;

determine in the system-type mapping the system type to which the internal production system identified in the destination address is mapped;

configure a honeypot with a honeypot configuration that is based on the determined system type, wherein the honeypot is deployed using the honeypot configuration;

deploy the honeypot in a container designated for the pattern of the packet, if not yet deployed;

store an entry in a honeypot library that includes the pattern of the packet associated to the honeypot configuration used for the honeypot; and forward all network traffic for the connection pair to the honeypot.

2. The computer network monitoring system of claim 1, wherein the processor, upon execution of the instructions is further configured to receive a destination address associated with a resolved domain name system (DNS) name included in a DNS request transmitted by the honeypot, the DNS name being resolved due to having been included in a DNS request transmitted by the honeypot.

3. The computer network monitoring system of claim 1, wherein the processor, upon execution of the instructions is further configured to apply a security action to an internal production system of the one or more internal production systems based upon a destination address in network traffic to or from the internal production system being a known malicious address or a DNS name of an outbound DNS request from the internal production system being a suspicious DNS name.

4. The computer network monitoring system of claim 3, wherein the security action is applied only when the suspicious DNS name is confirmed.

5. The computer network monitoring system of claim 3, wherein the security action is at least one of isolation of the computing device, blockage of transmissions from the computing device, and transmission of a warning message about a potential infection to the computing device or a recipient of network traffic from the computing device.

6. The computer network monitoring system of claim 1, wherein the processor of the inspection system, upon execution of the instructions, is further configured to store as a malicious address in the malicious address database a source address associated with network traffic that matches the pattern that matched the pattern of the packet.

7. The computer network monitoring system of claim 1, wherein the processor of the inspection system, upon execution of the instructions, is further configured to:

when a system type is determined to not be mapped to the internal production system, select the entry in the honeypot library that includes an entry for the pattern of the packet, if any; and configure the honeypot based on a honeypot configuration included with the selected entry.

8. The computer network monitoring system of claim 7, further comprising receiving a second packet, the second packet having an associated second source and destination address pair, where this second pair constitutes a second connection pair, wherein when it is determined that there is not an entry in the honeypot library that includes an entry for the pattern of the second packet, block any further communication for the second paired connection instead of deploying a honeypot.

9. The computer network monitoring system of claim 1, wherein the pattern of the plurality of patterns matched the pattern of the packet and the pattern that matched the pattern of the packet is associated with a system-type mapping, wherein the processor is further configured to, before deploying the honeypot, configure the honeypot with a honeypot configuration that is based on a system type indicated by the system-type mapping associated with the pattern that matched the pattern of the packet, wherein the honeypot is deployed using the honeypot configuration.

10. The computer network monitoring system of claim 1, further comprising a DNS server, the DNS server having a second memory configured to store second instructions and a second processor disposed in communication with the second memory, wherein the second processor, upon execution of the second instructions is configured to:

receive DNS requests exclusively from the plurality of honeypots;

resolve each DNS request received to determine a destination address resolved for a DNS name of the DNS request;

designate the DNS name to be stored as an unconfirmed suspicious DNS name, if not yet stored; and allow the DNS request to be sent to the resolved address if the DNS name is determined to not be malicious.

11. The computer network monitoring system of claim 10, wherein the second processor of the inspection system, upon execution of the second instructions, is further configured to:

designate the resolved destination address to be stored in a malicious address DB if the DNS name has been confirmed to be malicious; and reply to the DNS request with an IP address of the first processor as the resolved address.

12. The computer network monitoring system of claim 1, wherein the processor of the inspection system, upon execution of the instructions, is further configured to share with at least one other inspection system of the internal network, each of the inspection system and the respective at least one other inspection system processing different portions of the network traffic at least one of patterns of the plurality of patterns, addresses stored in the database of malicious addresses, and DNS names that were resolved.

13. A DNS server for processing DNS requests for managing botnet attacks to a computer network, the DNS server comprising a memory configured to store instructions and a processor disposed in communication with the memory, wherein the processor, upon execution of the instructions is configured to:

receive DNS requests exclusively from a plurality of honeypots operating as decoys for network traffic detected as being malicious, wherein the network traffic is directed to or from an internal production system and each honeypot is configured based on a determined system type, wherein the system type is determined based on a system type of the internal production system;

resolve each DNS request received to determine a destination address resolved for a DNS name of the DNS request;

designate the DNS name to be stored as an unconfirmed suspicious DNS name, if not yet stored; and allow the DNS request to be sent to the resolved destination address if the DNS name is determined to not be malicious.

14. The DNS server of claim 13, wherein the processor, upon execution of the instructions is further configured to:

designate the resolved destination address to be stored in a malicious address DB if the DNS name has been confirmed to be malicious; and reply to the DNS request with an IP address of an inspection device that inspects traffic of the network as the resolved address.

15. A method of monitoring a network, the method comprising:

monitoring network traffic to and/or from a protected network of computing systems, comprising:

receiving a packet of the network traffic while monitoring the network traffic, the packet having an associated source and destination address pair, where this pair constitutes a connection pair;

comparing a pattern of the packet to a plurality of patterns and/or compare a source or destination address of the packet to known malicious addresses; and responsive to determining that the pattern of the packet matches a pattern of the plurality of patterns or the source or destination address of the packet matches a known malicious address of the known malicious addresses, consulting a system-type mapping that maps each internal production system to a system type;

determining in the system-type mapping the system type to which the internal production system identified in the destination address is mapped;

configuring a honeypot with a honeypot configuration that is based on the determined system type, wherein the honeypot is deployed using the honeypot configuration;

deploying the honeypot in a container designated for the pattern of the packet if not yet deployed;

storing an entry in a honeypot library that includes the pattern of the packet associated to the honeypot configuration used for the honeypot;

forwarding all network traffic for the connection pair to the honeypot; and forwarding remaining network traffic to its corresponding destination address.

16. The method of claim 15, further comprising applying a security action to an internal production system of the one or more internal production systems based upon a source or destination address in network traffic to or from the internal production system being a known malicious address or a DNS name of an outbound DNS request from the internal production system being a suspicious DNS name.

17. The method of claim 15, further comprising storing as a malicious address in the malicious address database a source address associated with network traffic that matches the pattern.

18. The method of claim 15, further comprising:
consulting a system-type mapping that maps each internal production system to a system type;
before deploying the honeypot, determining in the system-type mapping the system type to which the internal production system that identified in the destination address is mapped;
configuring the honeypot with a honeypot configuration that is based on the determined system type, wherein the honeypot is deployed using the honeypot configuration; and
storing an entry in a honeypot library that includes the pattern of the packet associated to the honeypot configuration used for the honeypot.

19. The method of claim 18, further comprising:
when a system type is determined to not be mapped to the internal production system, selecting the entry in the honeypot library that includes an entry for the pattern of the packet, if any; and
configuring the honeypot based on a honeypot configuration included with the selected entry,
receiving a second packet, the second packet having an associated second source and destination address pair, where this second pair constitutes a second connection pair, wherein when it is determined that there is not an entry in the honeypot library that includes an entry for the pattern of the pocket, the method further comprises blocking any further communication for the second paired connection instead of deploying a honeypot.

20. A method of processing DNS requests for managing botnet attacks to a computer network, the method comprising:
receiving DNS requests exclusively from a plurality of honeypots operating as decoys for network traffic detected as being malicious, wherein the network traffic is directed to or from an internal production system and each honeypot is configured based on a determined system type, wherein the system type is determined based on a system type of the internal production system;
resolving each DNS request received to determine a destination address resolved for a DNS name of the DNS request;
designating the DNS name to be stored as an unconfirmed suspicious DNS name, if not yet stored; and
allowing the DNS request to be sent to the resolved destination address if the DNS name is determined to not be malicious.

21. The method of claim 20, further comprising:
designating the resolved destination address to be stored in a malicious address DB if the DNS name has been confirmed to be malicious; and
replying to the DNS request with an IP address of an inspection device that inspects traffic of the network as the resolved address.

* * * * *